US011187933B2

(12) United States Patent
Ko et al.

(10) Patent No.: US 11,187,933 B2
(45) Date of Patent: Nov. 30, 2021

(54) LCOS DISPLAY PANEL HAVING UV CUT FILTER

(71) Applicant: OmniVision Technologies, Inc., Santa Clara, CA (US)

(72) Inventors: Pei-Wen Ko, Taipei (TW); Chun-Sheng Fan, Zhudong Township (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 125 days.

(21) Appl. No.: 16/057,950

(22) Filed: Aug. 8, 2018

(65) Prior Publication Data

US 2020/0050051 A1    Feb. 13, 2020

(51) Int. Cl.
*G02F 1/1335* (2006.01)
*G02F 1/1337* (2006.01)
*G02F 1/1339* (2006.01)
*G02F 1/136* (2006.01)

(52) U.S. Cl.
CPC ...... *G02F 1/133509* (2013.01); *G02F 1/1339* (2013.01); *G02F 1/133723* (2013.01); *G02F 1/136* (2013.01); *G02F 2203/055* (2013.01)

(58) Field of Classification Search
CPC ......... G02F 1/133509; G02F 1/133723; G02F 1/1339; G02F 1/136
See application file for complete search history.

(56) References Cited

U.S. PATENT DOCUMENTS

| 6,111,700 | A  | * | 8/2000 | Kobayashi | G02B 5/3025 348/E9.027 |
| 6,219,113 | B1 | * | 4/2001 | Takahara | G02F 1/1334 345/98 |
| 6,288,764 | B1 | * | 9/2001 | Zhang | G02F 1/1339 349/152 |
| 6,368,732 | B1 | * | 4/2002 | Jin | C08G 61/02 257/103 |
| 6,876,412 | B2 |   | 4/2005 | udaka et al. | |
| 8,709,192 | B2 |   | 4/2014 | Wang et al. | |
| 2002/0154104 | A1 | * | 10/2002 | Inoue | G09G 3/3648 345/204 |
| 2005/0041214 | A1 |   | 2/2005 | Kawaai | |
| 2006/0043318 | A1 |   | 3/2006 | Kodera | |
| 2010/0073613 | A1 | * | 3/2010 | Yamada | G02F 1/13394 349/110 |
| 2011/0110207 | A1 | * | 5/2011 | Katayama | G11B 7/0065 369/44.32 |

* cited by examiner

*Primary Examiner* — Lucy P Chien (57) ABSTRACT

A LCOS display panel comprises a silicon substrate, a pixel structure on the silicon substrate, a first and a second PI (polyimide) layers, a LC (liquid crystal) layer between the first and the second PI layers, wherein the second PI layer is disposed on the pixel structure, and the LC layer is disposed on the second PI layer, a glass substrate, an ITO (indium tin oxide) layer, a dam sealing a perimeter of the LCOS display panel to enclose the LC layer within the dam, wherein the dam is disposed between the first and second PI layers, and holds the silicon substrate and the glass substrate together, and a UV (ultra violet) cut filter in an active area of the LCOS display panel, wherein the active area of the LCOS display panel includes the LC layer and the pixel structure.

11 Claims, 12 Drawing Sheets

| Layer No. | Material | Thickness (nm) |
|---|---|---|
| Layer-1 | SIO2 | 73.66 |
| Layer-2 | TA2O5 | 48.27 |
| Layer-3 | SIO2 | 24.53 |
| Layer-4 | TA2O5 | 39.27 |
| Layer-5 | TA2O5 | 45.72 |
| Layer-6 | SIO2 | 37.51 |
| Layer-7 | TA2O5 | 73.24 |
| Layer-8 | SIO2 | 31.44 |
| Layer-9 | TA2O5 | 63.13 |
| Layer-10 | SIO2 | 60.99 |
| Layer-11 | TA2O5 | 19.75 |
| Layer-12 | TA2O5 | 39.99 |
| Layer-13 | SIO2 | 43.18 |
| Layer-14 | TA2O5 | 56.85 |
| Layer-15 | SIO2 | 59.74 |
| Layer-16 | TA2O5 | 52.96 |
| Layer-17 | TA2O5 | 17.42 |
| Layer-18 | SIO2 | 35.88 |
| Layer-19 | TA2O5 | 58.59 |
| Layer-20 | SIO2 | 54.39 |
| Layer-21 | TA2O5 | 50.06 |
| Layer-22 | TA2O5 | 25.55 |
| Layer-23 | SIO2 | 40.02 |
| Layer-24 | TA2O5 | 43.85 |
| Layer-25 | SIO2 | 22.04 |
| Layer-26 | SIO2 | 48.87 |
| Layer-27 | TA2O5 | 101.51 |
| Layer-28 | TA2O5 | 20.35 |
| Layer-29 | TA2O5 | 39.09 |
| Layer-30 | SIO2 | 70.41 |
| Layer-31 | SIO2 | 145.49 |
| Layer-32 | TA2O5 | 35.83 |
| Layer-33 | SIO2 | 1.49 |
| Layer-34 | TA2O5 | 66.63 |
| Layer-35 | SIO2 | 43.38 |
| Layer-36 | ITO | 205.34 |
| Total | | 1896.42 |

| Layer No. | Material | Thickness (nm) |
|---|---|---|
| Layer-1 | SIO2 | 52.19 |
| Layer-2 | TA2O5 | 248.85 |
| Layer-3 | TA2O5 | 42.57 |
| Layer-4 | SIO2 | 69.34 |
| Layer-5 | TA2O5 | 53.94 |
| Layer-6 | SIO2 | 62.74 |
| Layer-7 | TA2O5 | 50.72 |
| Layer-8 | SIO2 | 80.38 |
| Layer-9 | TA2O5 | 44.31 |
| Layer-10 | SIO2 | 73.22 |
| Layer-11 | TA2O5 | 44.82 |
| Layer-12 | SIO2 | 64.76 |
| Layer-13 | TA2O5 | 146.6 |
| Layer-14 | SIO2 | 69.11 |
| Layer-15 | TA2O5 | 135.33 |
| Layer-16 | TA2O5 | 94.68 |
| Layer-17 | SIO2 | 46.94 |
| Layer-18 | TA2O5 | 108.57 |
| Layer-19 | SIO2 | 33.08 |
| Layer-20 | SIO2 | 31.28 |
| Layer-21 | TA2O5 | 34.27 |
| Layer-22 | SIO2 | 52.75 |
| Layer-23 | TA2O5 | 40 |
| Layer-24 | SIO2 | 49.37 |
| Layer-25 | TA2O5 | 42.46 |
| Layer-26 | SIO2 | 62.78 |
| Layer-27 | TA2O5 | 32.66 |
| Layer-28 | SIO2 | 46.61 |
| Layer-29 | SIO2 | 64.01 |
| Layer-30 | TA2O5 | 27.24 |
| Layer-31 | SIO2 | 43.13 |
| Layer-32 | TA2O5 | 39.17 |
| Layer-33 | SIO2 | 34.88 |
| Layer-34 | TA2O5 | 46.96 |
| Layer-35 | SIO2 | 50.81 |
| Layer-36 | ITO | 202.77 |
| Total | | 2423.3 |

| Layer No. | Material | Thickness (nm) |
|---|---|---|
| Layer-1 | SIO2 | 76.53 |
| Layer-2 | TA2O5 | 40.26 |
| Layer-3 | SIO2 | 38.06 |
| Layer-4 | TA2O5 | 76.42 |
| Layer-5 | SIO2 | 19.63 |
| Layer-6 | SIO2 | 14.48 |
| Layer-7 | TA2O5 | 78.66 |
| Layer-8 | SIO2 | 27.44 |
| Layer-9 | TA2O5 | 67.09 |
| Layer-10 | SIO2 | 8.7 |
| Layer-11 | SIO2 | 58.45 |
| Layer-12 | TA2O5 | 43.4 |
| Layer-13 | SIO2 | 60.59 |
| Layer-14 | TA2O5 | 54.19 |
| Layer-15 | SIO2 | 61.79 |
| Layer-16 | TA2O5 | 46.31 |
| Layer-17 | TA2O5 | 18.39 |
| Layer-18 | SIO2 | 24.57 |
| Layer-19 | TA2O5 | 80.32 |
| Layer-20 | SIO2 | 61.54 |
| Layer-21 | TA2O5 | 43.05 |
| Layer-22 | SIO2 | 36.99 |
| Layer-23 | SIO2 | 29.08 |
| Layer-24 | TA2O5 | 38.63 |
| Layer-25 | SIO2 | 13.9 |
| Layer-26 | SIO2 | 41.76 |
| Layer-27 | TA2O5 | 28.09 |
| Layer-28 | SIO2 | 31.66 |
| Layer-29 | TA2O5 | 40.68 |
| Layer-30 | SIO2 | 62.97 |
| Layer-31 | TA2O5 | 35.82 |
| Layer-32 | SIO2 | 15.02 |
| Layer-33 | SIO2 | 25.64 |
| Layer-34 | TA2O5 | 90.76 |
| Layer-35 | TA2O5 | 24.41 |
| Layer-36 | SIO2 | 37.66 |
| Layer-37 | TA2O5 | 39.65 |
| Layer-38 | SIO2 | 60.83 |
| Layer-39 | TA2O5 | 12.03 |
| Layer-40 | SIO2 | 67.84 |
| Total | | 1733.29 |

| Layer No. | Material | Thickness (nm) |
|---|---|---|
| Layer-1 | SiO2 | 61.11 |
| Layer-2 | TA2O5 | 125.58 |
| Layer-3 | SiO2 | 61.68 |
| Layer-4 | TA2O5 | 86.94 |
| Layer-5 | TA2O5 | 26.88 |
| Layer-6 | SiO2 | 53.29 |
| Layer-7 | TA2O5 | 40.71 |
| Layer-8 | SiO2 | 100.53 |
| Layer-9 | TA2O5 | 37.61 |
| Layer-10 | SiO2 | 62.54 |
| Layer-11 | TA2O5 | 39.64 |
| Layer-12 | SiO2 | 55.35 |
| Layer-13 | TA2O5 | 37.93 |
| Layer-14 | SiO2 | 54.62 |
| Layer-15 | TA2O5 | 35.03 |
| Layer-16 | SiO2 | 62.48 |
| Layer-17 | TA2O5 | 35.58 |
| Layer-18 | SiO2 | 65.19 |
| Layer-19 | TA2O5 | 38.78 |
| Layer-20 | SiO2 | 60.45 |
| Layer-21 | TA2O5 | 80.57 |
| Layer-22 | SiO2 | 29.36 |
| Layer-23 | SiO2 | 31.95 |
| Layer-24 | TA2O5 | 39.45 |
| Layer-25 | SiO2 | 61.99 |
| Layer-26 | SiO2 | 8.91 |
| Layer-27 | TA2O5 | 37.97 |
| Layer-28 | SiO2 | 78.18 |
| Layer-29 | TA2O5 | 56.87 |
| Layer-30 | SiO2 | 57.04 |
| Layer-31 | TA2O5 | 56.64 |
| Layer-32 | SiO2 | 19.04 |
| Layer-33 | SiO2 | 66.84 |
| Layer-34 | TA2O5 | 36.82 |
| Layer-35 | SiO2 | 32.38 |
| Layer-36 | SiO2 | 53.42 |
| Layer-37 | TA2O5 | 34.88 |
| Layer-38 | SiO2 | 4.39 |
| Total | | 1928.62 |

LCOS DISPLAY PANEL HAVING UV CUT FILTER

FIELD OF THE INVENTION

This invention relates to LCOS (liquid crystal on silicon) display panel, and more specifically relates to LCOS display panel having UV (ultra violet) cut filter.

BACKGROUND OF THE INVENTION

LCOS (liquid crystal on silicon) displays are used in consumer electronics, such as hand-held projectors, medical equipment displays, automotive displays, and near-eye displays, and also have applications in optical communications technologies. A LCOS display includes a reflective LCOS display panel comprising a pixel structure formed on a semiconductor wafer.

A LCOS display panel comprises a LC (liquid crystal) layer containing LC molecules. The orientations of the LC molecules are controlled by the electrical signals at each pixel of the pixel structure to form an image for display. The liquid crystal layer is sealed with a dam between a silicon substrate (semiconductor wafer) and a glass substrate.

The dam material may be a paste or liquid material before curing with UV light. When the dam is UV cured, UV light is prevented from illuminating the LC layer, because it will age the LC molecules and the performance of the display panel will deteriorate. Typically, a UV mask is prepared to cover the LC layer, thus it may be costly and may increase the manufacturing time for UV mask alignment for each processed wafer. Accordingly, LCOS display panels that require no UV mask in the manufacturing process is demanded.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1:
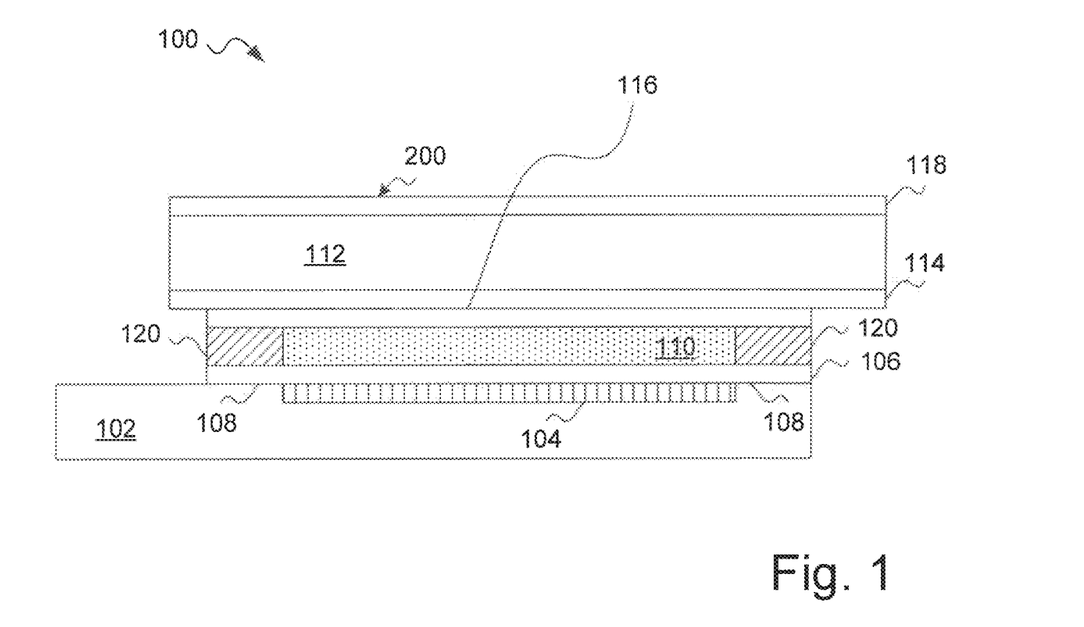
FIG. 1 illustrates schematically a LCOS display panel.

FIG. 1 illustrates schematically a LCOS display panel 100. LCOS display panel 100 comprises a silicon substrate 102 having pixel structure 104 formed on silicon substrate 102 and its corresponding electric circuit (not shown) embedded in silicon substrate 102. A first PI (polyimide) layer 106 is disposed over pixel structure 104 and surface 108 of silicon substrate 102. First PI layer 106 is an alignment layer that aligns the orientation of LC molecules of a LC layer 110 disposed over it.

Figure 2:
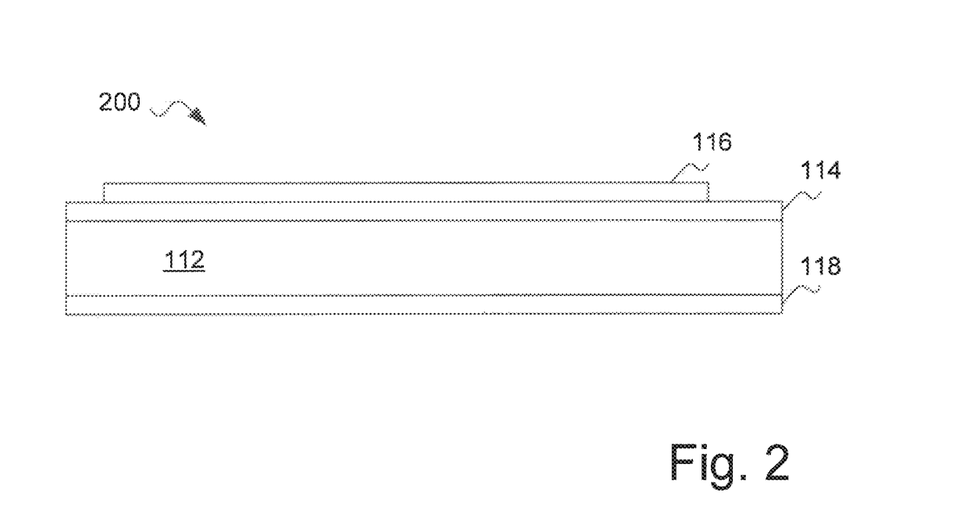
FIG. 2 illustrates schematically a glass structure included in the LCOS display panel.

FIG. 2 illustrates schematically a glass structure 200 comprising a glass substrate 112. An ITO (indium tin oxide) layer 114 is coated on a first surface of glass substrate 112. A second PI layer 116 is disposed on and attached to ITO layer 114. Optionally, a second surface opposite to the first surface of glass substrate 112 is coated with an AR (anti reflection) layer 118.

LCOS display panel 100 further comprises glass structure 200 flipped over the position shown in FIG. 2. Second PI layer 116 faces first PI layer 106. Second PI layer 116 is disposed on LC layer 110. Second PI layer 116 aligns the orientation of LC molecules in the vicinity of second PI layer 116, and first PI layer 106 aligns the orientation of LC molecules in the vicinity of first PI layer 106. LC layer 110 is between first PI layer 106 and second PI layer 116. A dam 120 is formed to seal LC material between first PI layer 106 adjacent to silicon substrate 102 and second PI layer 116 adjacent to ITO layer 114. In the flipped position, ITO layer 114 is disposed on second PI layer 116, and optionally AR layer 118 is disposed on glass substrate 112.

Dam 120 seals the perimeter of LCOS display panel 100 defining a LC reservoir. Dam 120 is disposed between first PI layer 106 and second PI layer 116 and holds silicon substrate 102 and glass substrate 112 together. Dam 120 encloses LC layer 110 within dam 120. Dam 120 may be made from UV-cure materials, time/temperature cure materials, or photo-patterning materials.

For dam 120 made from UV-cure materials, the process to UV cure dam 120 must be carried out carefully. The UV light is not allowed to illuminate parts of first and second PI layers 106 and 116, and LC layer 110 that transmit visible light to form a displayed image. The UV light may age first and second PI layers 106 and 116, and LC layer 110, because these layers are made of organic materials containing benzene rings having double bonds. Benzene absorbs UV light, and this will change the characteristics of the LC materials and the PI materials. Upon absorption of UV light, the LC materials and the PI materials suffer from aging and this will affect the life-time of the LCOS display panel 100.

Figure 3:
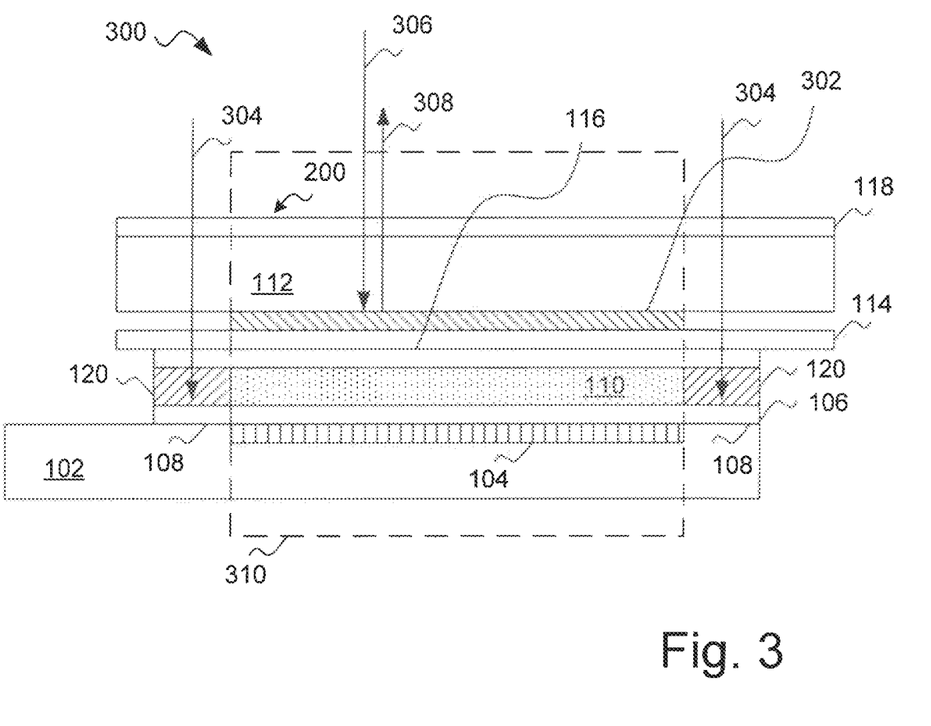
FIG. 3 illustrates schematically a LCOS display panel, according to an embodiment of the present invention.

FIG. 3 illustrates schematically a LCOS display panel 300, according to an embodiment of the present invention. LCOS display panel 300 is similar to LCOS display panel 100 of FIG. 1, except it has an additional UV cut filter 302. UV cut filter 302 is preferably an interference filter that reflects an incoming UV light. UV cut filter 302 is formed on glass substrate 112 between glass substrate 112 and ITO layer 114. In other words, UV cut filter 302 is disposed on ITO layer 114, and glass substrate 112 is disposed on UV cut filter 302. UV cut filter 302 covers an active area 310 of LCOS display panel 300 including LC layer 110 and pixel structure 104. It is appreciated that UV cut filter 310 covers LC layer 110. Alternatively, UV cut filter 302 may be formed between ITO layer 114 and second PI layer 116 (not shown).

The LC layer is more sensitive to UV light as compare with the PI layer. By covering active area 310 from UV exposure, LC layer 110 and the projection light transmitting parts of first PI layer 106 and second PI layer 116 will not be aged, and thus no optical and physical characteristics change. An image is displayed in active area 310. The inclusion of a UV cut filter is also useful for automotive and other applications that may expose the LCOS display panel to sun light or UV light.

UV light 304 transmits through AR layer 118, glass substrate 112, ITO layer 114, second PI layer 116, dam 120, first PI layer 106, and silicon substrate 102, and UV light 304 is absorbed by dam 120 to UV cure dam 120. No UV cut filter 302 is blocking UV light 304. Accordingly, dam 120 can be UV cured.

However, UV light 306 illuminating active area 310 is reflected by UV cut filter 302, and prevented from exposing LC layer 110, and parts of second PI layer 116 and first PI layer 106 immediately on top and below LC layer 110, respectively.

Figure 4:
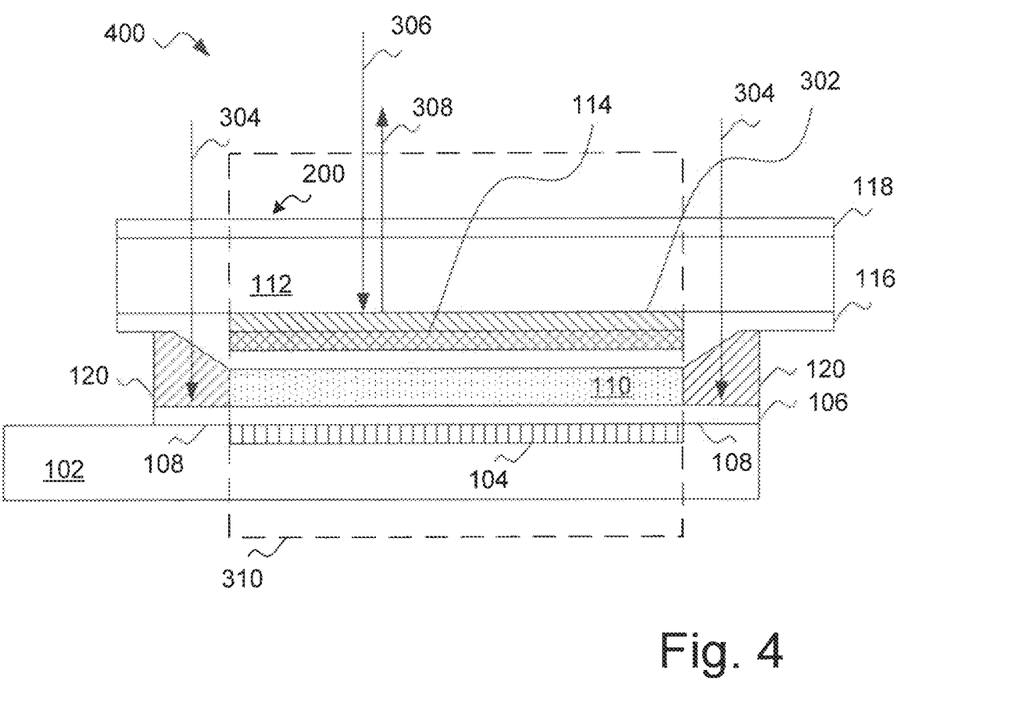
FIG. 4 illustrates schematically a LCOS display panel, according to an embodiment of the present invention.

FIG. 4 illustrates schematically a LCOS display panel 400, according to an embodiment of the present invention. LCOS display panel 400 is similar to LCOS display panel 300 of FIG. 3, except the following. ITO layer 114 has the same size as UV cut filter 302. No UV cut filter 302 and no ITO layer 114 are in the path of UV light 304. Furthermore, UV cut filter 302 and ITO layer 114 are enclosed in second PI layer 116 attached to glass substrate 112. Accordingly, no empty space extending from UV cut filter 302.

UV light 304 transmits through AR layer 118, glass substrate 112, second PI layer 116, dam 120, first PI layer 106, and silicon substrate 102, and UV light 304 is absorbed by dam 120 to UV cure dam 120. No UV cut filter 302 and no ITO layer 114 are in the path of UV light 304. Accordingly, dam 120 can be UV cured.

Parts of first PI layer 106 and second PI layer 116 outside active area 310, which is defined by LC layer 110, are exposed to UV light. It has almost no effect on active area 310. By covering active area 310 from UV exposure, LC layer 110 and the projection light transmitting parts of first PI layer 106 and second PI layer 116 will not be aged, and thus no optical and physical characteristics change. Accordingly, it does not affect the performance of LCOS display panel 400. An image is displayed in active area 310.

Figure 5:
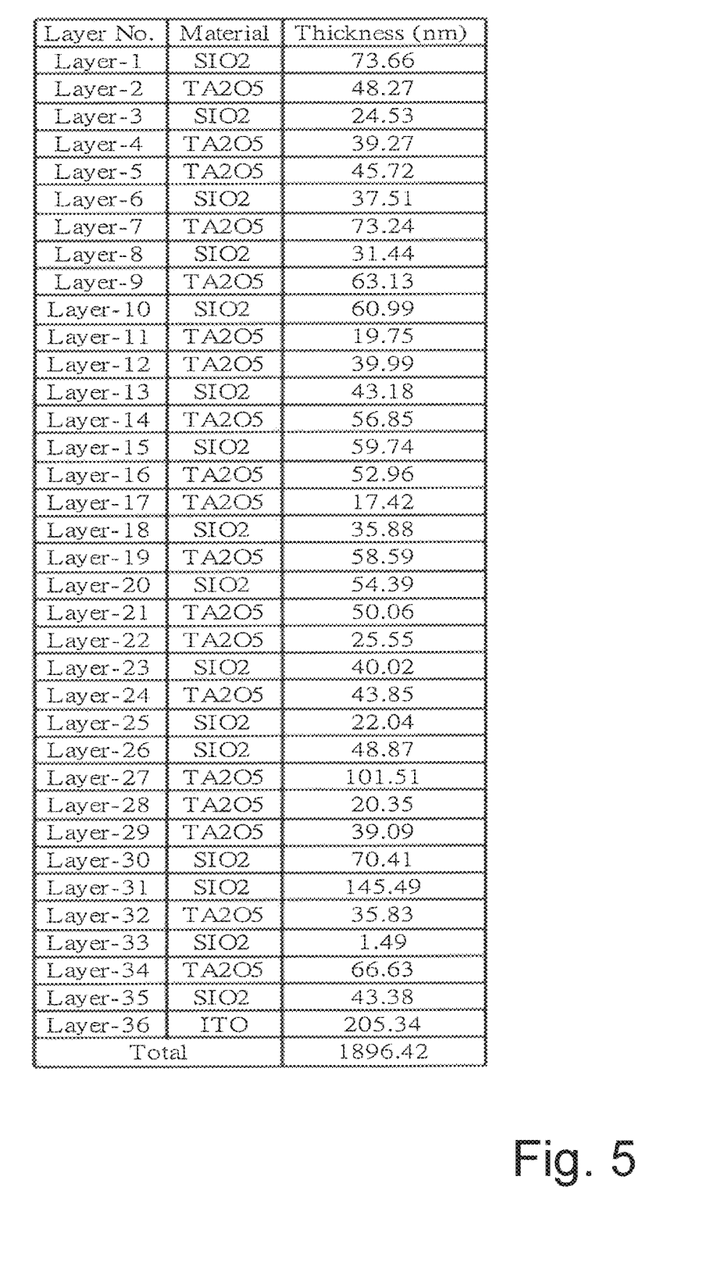
FIG. 5 shows an exemplary UV cut filter, which is an interference filter comprising multiple thin films, according to an embodiment of the present invention.

UV cut filter 302 is preferably an interference filter comprising multiple thin films as shown in FIG. 5. FIG. 5 shows a multiple thin film structure of an exemplary interference filter according to an embodiment of the present invention. The interference filter is made of alternate films of $SiO_2$ (silicon dioxide) having lower refractive index (1.4585) and $Ta_2O_5$ (tantalum pentoxide) having higher refractive index (2.1306) coated on glass substrate 112. The film farthest from glass substrate 112 is further coated with ITO layer 114.

Figure 6:
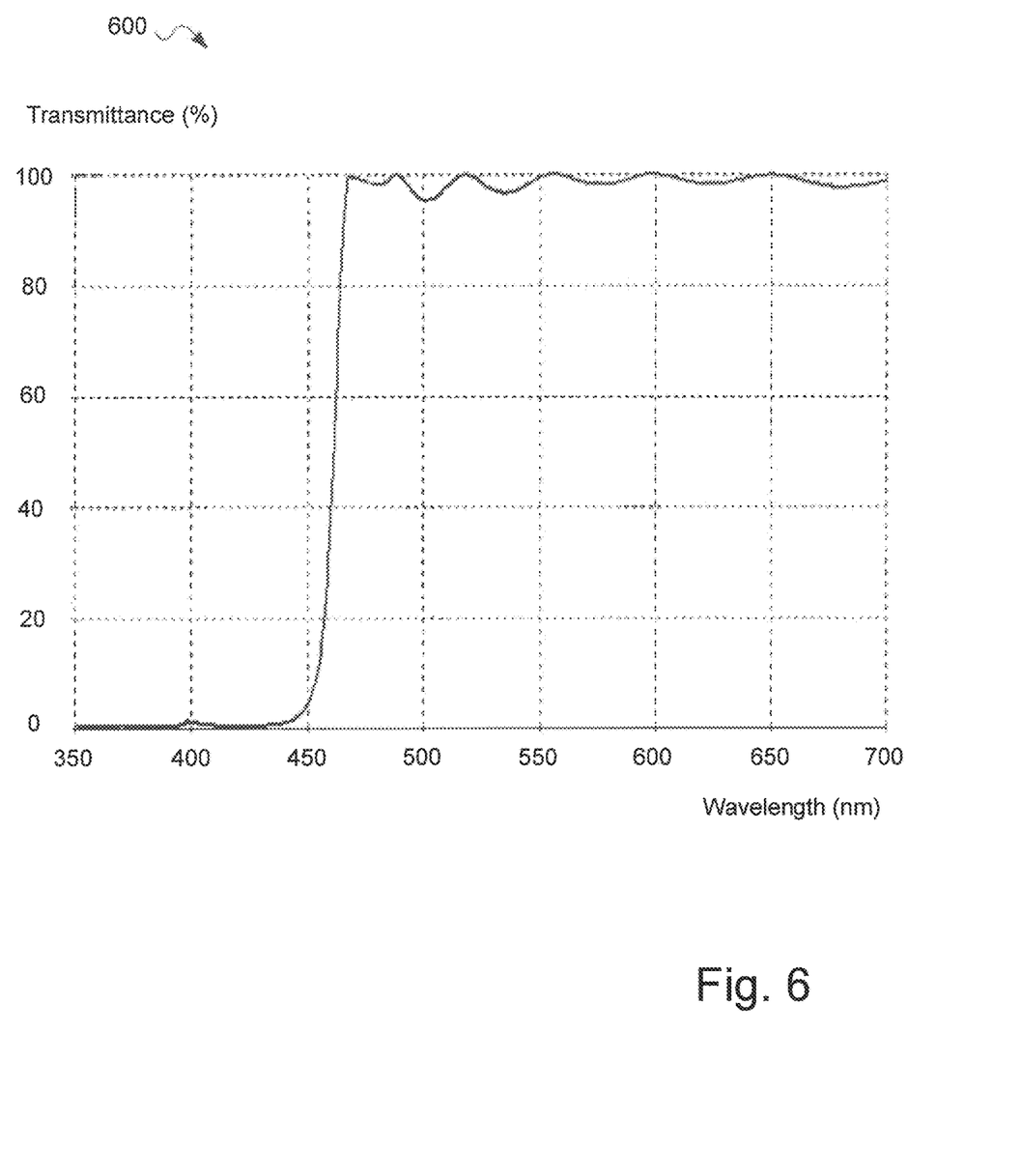
FIG. 6 shows an exemplary spectral transmittance response of the UV cut filter of FIG. 5, according to an embodiment of the present invention.

An exemplary spectral transmittance response 600 of UV cut filter 302 of FIG. 5 is depicted in FIG. 6, according to an embodiment of the present invention. Spectral response 600 shows that UV light having wavelength less than 450 nm is reflected, and visible light having wavelength larger than 465 nm is almost completely transmitted. UV cut filter 302 of FIG. 5 reflects UV light when dam 120 is UV cured during the manufacture of LCOS display panel 400, but transmits visible light when LCOS display panel 400 is in operation. Thus LCOS display panel 400 can be used for displaying visible image.

Figure 7:
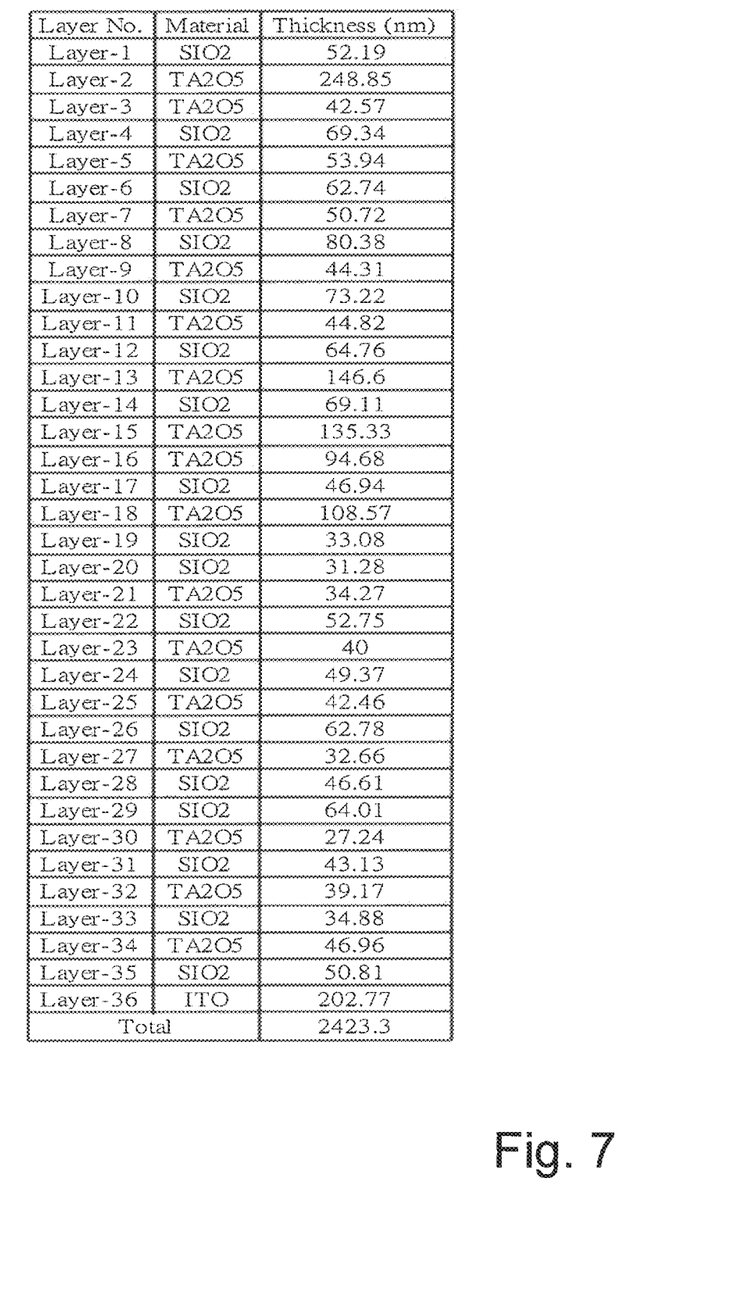
FIG. 7 shows an exemplary UV cut filter, which is an interference filter comprising multiple thin films, according to an embodiment of the present invention.

Similarly, UV cut filter 302 is preferably an interference filter comprising multiple thin films as shown in FIG. 7. FIG. 7 shows another multiple thin film structure of an exemplary interference filter, according to an embodiment of the present invention. The interference filter is similarly made of alternate films of $SiO_2$ (silicon dioxide) having lower refractive index (1.4585) and $Ta_2O_5$ (tantalum pentoxide) having higher refractive index (2.1306) coated on glass substrate 112. The film farthest from glass substrate 112 is further coated with ITO layer 114.

Figure 8:
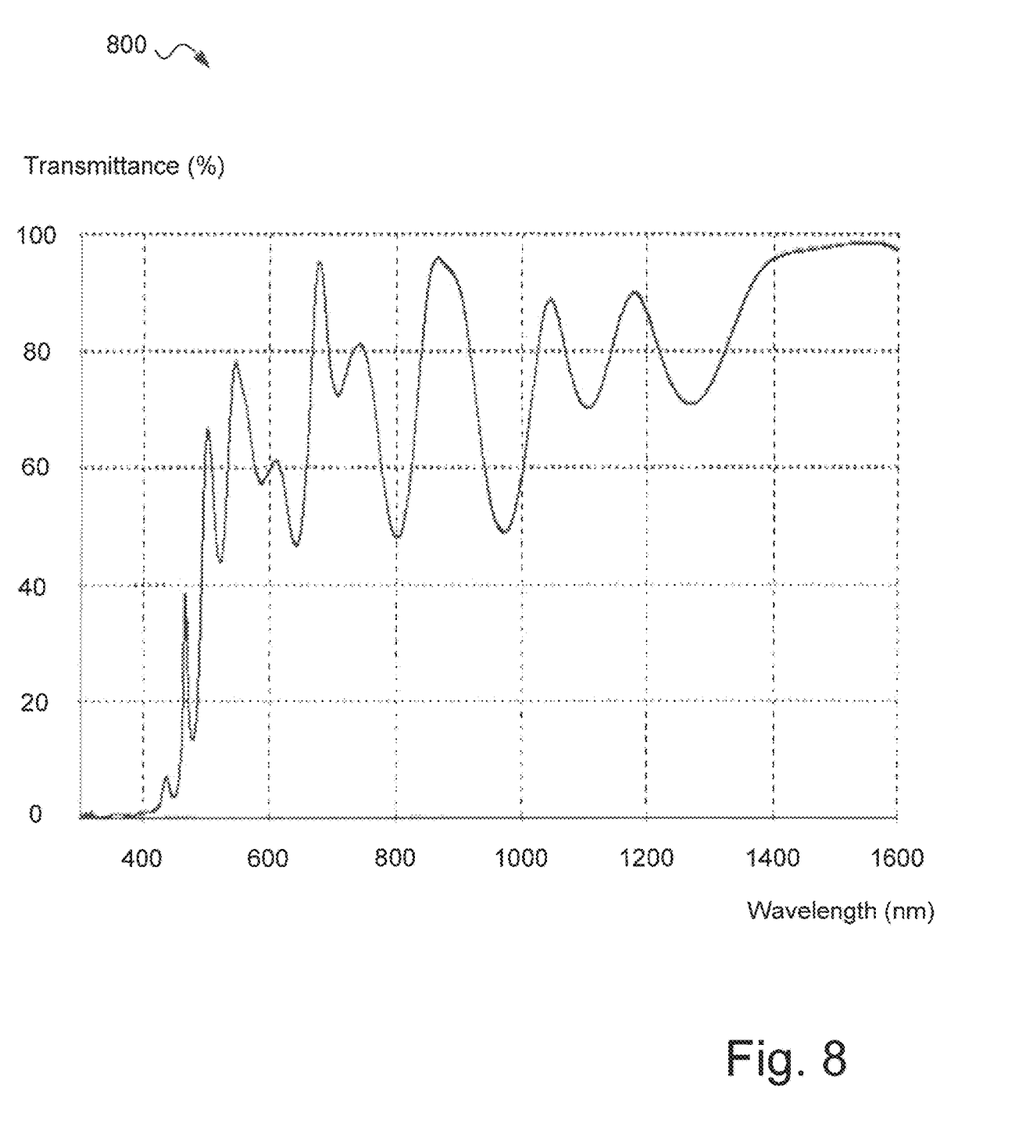
FIG. 8 shows an exemplary spectral transmittance response of the UV cut filter of FIG. 7, according to an embodiment of the present invention.

An exemplary spectral transmittance response 800 of UV cut filter 302 of FIG. 7 is depicted in FIG. 8, according to an embodiment of the present invention. Spectral response 800 shows that UV light having wavelength less than 450 nm is reflected, and SWIR (short wave infra red, 1400-3000 nm) light having wavelength larger than 1400 nm is almost completely transmitted. UV cut filter 302 of FIG. 7 reflects UV light when dam 120 is UV cured during the manufacture of LCOS display panel 400, but transmits SWIR light when LCOS display panel 400 is in operation for any applications, such as telecommunications and others.

Figure 9:
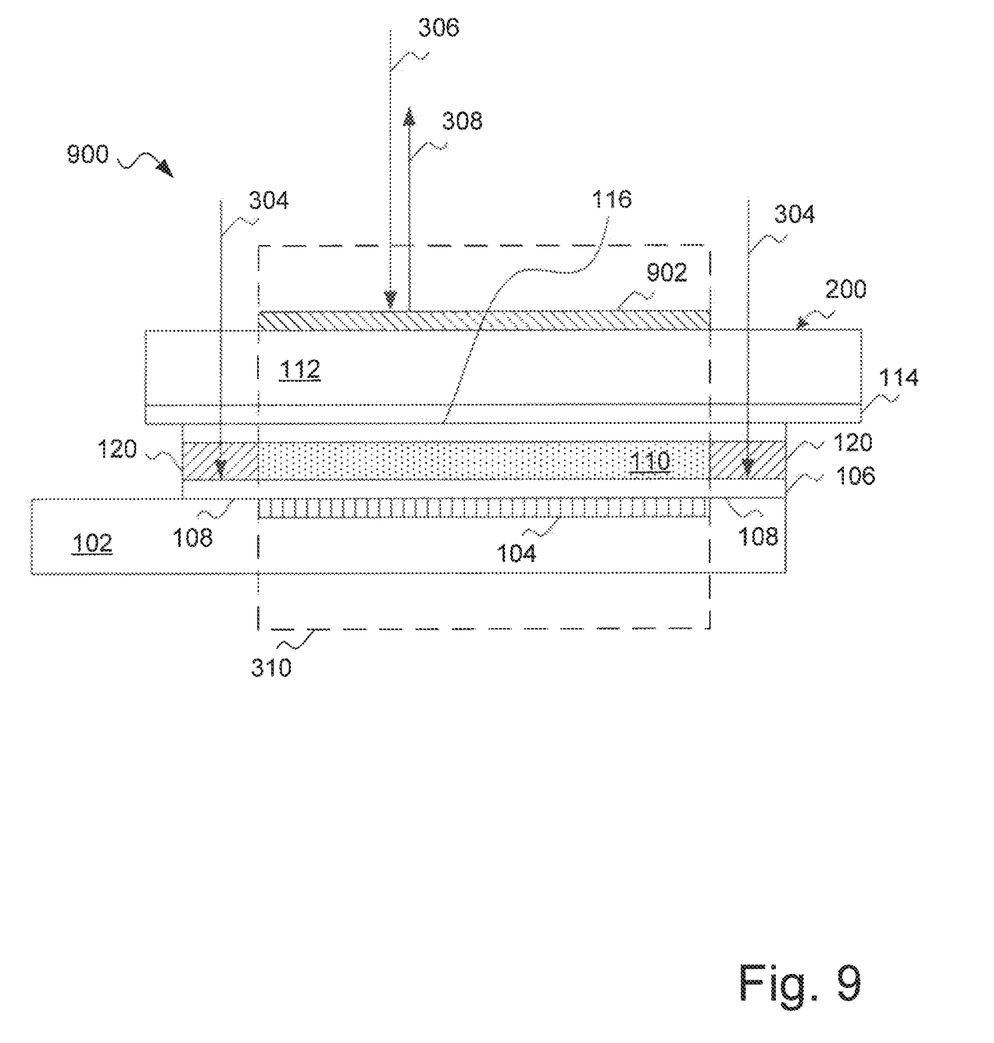
FIG. 9 illustrates schematically a LCOS display panel, according to an embodiment of the present invention.

FIG. 9 illustrates schematically a LCOS display panel 900, according to an embodiment of the present invention. LCOS display panel 900 is similar to LCOS display panel 100 of FIG. 1, except AR layer 118 is removed and replaced with an additional UV cut filter 902. UV cut filter 902 is preferably an interference filter that reflects an incoming UV light. AR layer 118 is replaced with UV cut filter 902 forming on a surface of glass substrate 112 opposite to ITO layer 114. UV cut filter 902 covers an active area 310 of LCOS display panel 900 including LC layer 110 and pixel structure 104. Since no UV cut filter 902 (or 302) is between glass substrate 112 and ITO layer 114, glass substrate 112 is disposed on ITO layer.

UV light 304 can transmit through glass substrate 112, ITO layer 114, second PI layer 116, dam 120, first PT layer 106, and silicon substrate 102, and UV light 304 is absorbed by dam 120 to UV cure dam 120. No UV cut filter 902 is in the path of UV light 304. Accordingly, dam 120 can be UV cured.

Parts of first PI layer 106 and second PI layer 116 outside active area 310, which is defined by LC layer 110, are exposed to UV light. It has almost no effect on active area 310. By covering active area 310 from UV exposure, LC layer 110 and the projection light transmitting parts of first PI layer 106 and second PI layer 116 will not be aged, and thus no optical and physical characteristics change. Accordingly, it does not affect the performance of LCOS display panel 900. An image is displayed in active area 310.

Figure 10:
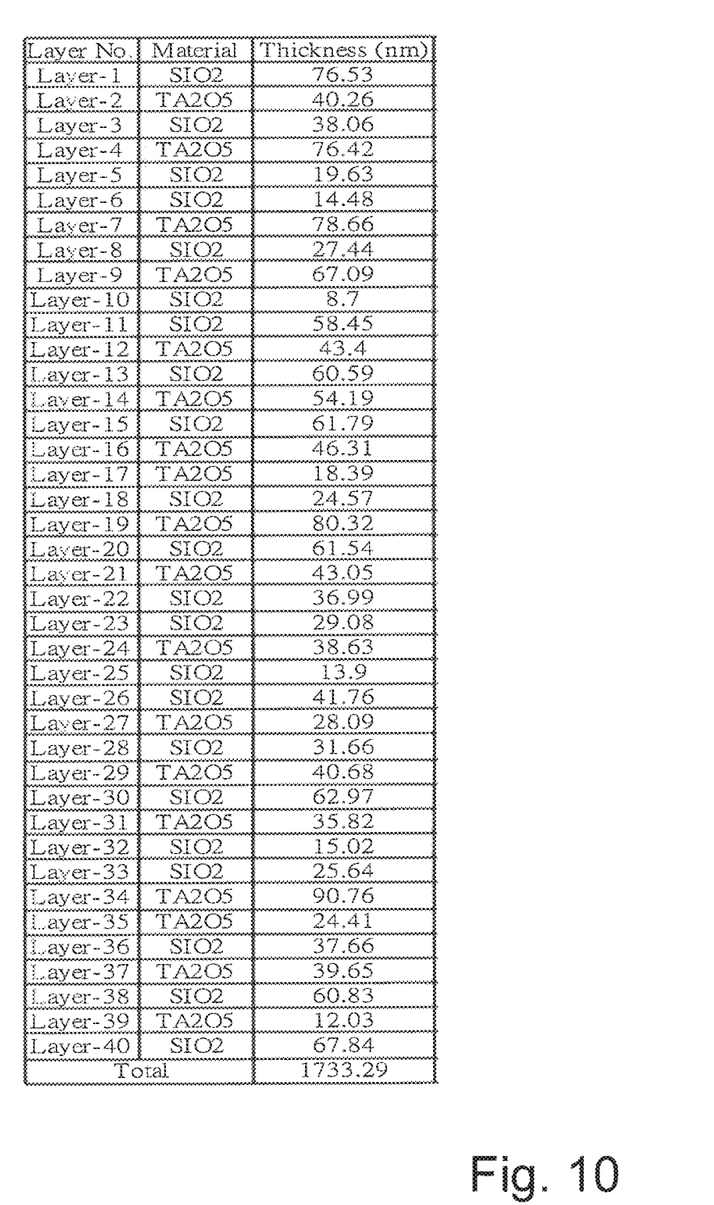
FIG. 10 shows an exemplary UV cut filter, which is an interference filter comprising multiple thin films, according to an embodiment of the present invention.

UV cut filter 902 is preferably an interference filter comprising multiple thin films as shown in FIG. 10. FIG. 10 shows a multiple thin film structure of an exemplary interference filter, according to an embodiment of the present invention. The interference filter is made of alternate films of $SiO_2$ (silicon dioxide) having lower refractive index (1.4585) and $Ta_2O_5$ (tantalum pentoxide) having higher refractive index (2.1306) coated on glass substrate 112 opposite to ITO layer 114.

Figure 11:
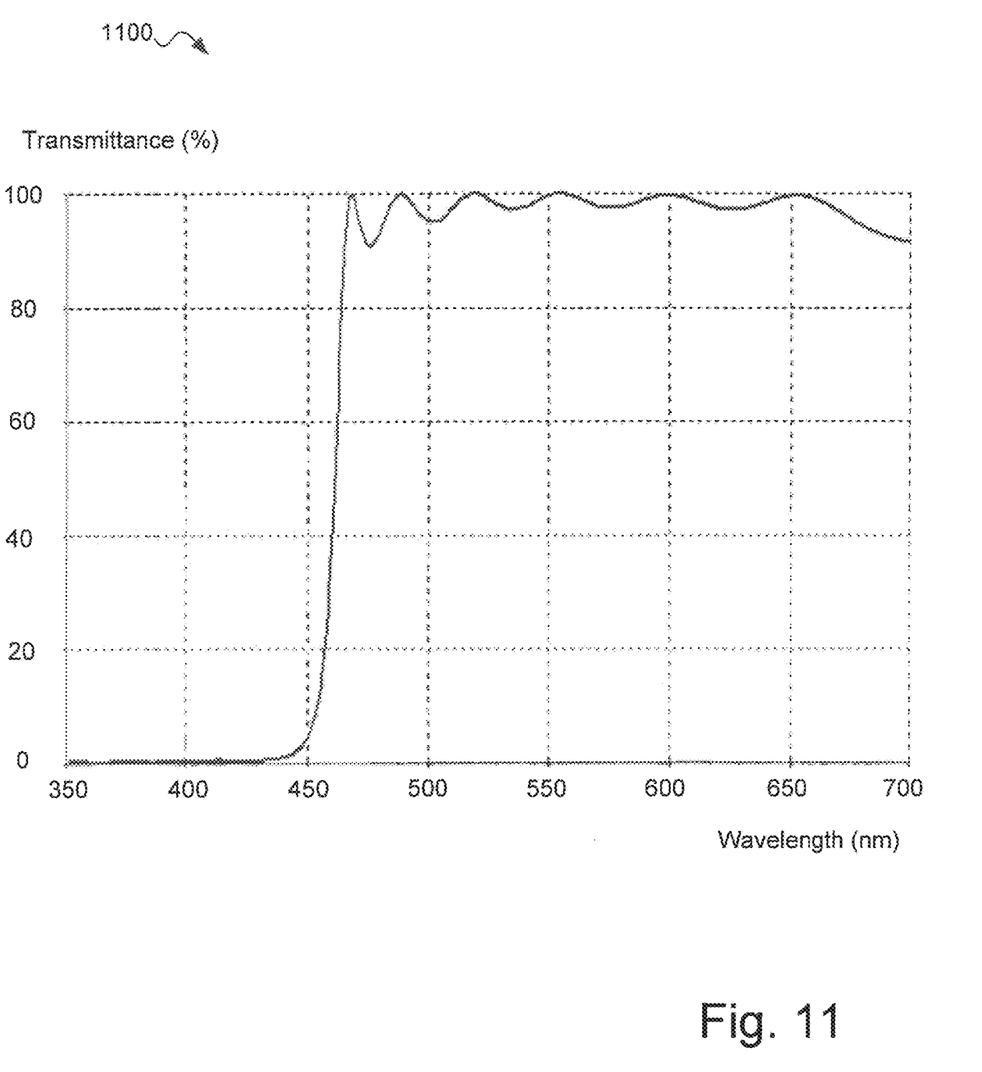
FIG. 11 shows an exemplary spectral transmittance response of the UV cut filter of FIG. 10, according to an embodiment of the present invention.

An exemplary spectral transmittance response 1100 of UV cut filter 902 of FIG. 10 is depicted in FIG. 11, according to an embodiment of the present invention. Spectral response 1100 shows that UV light having wavelength less than 450 nm is reflected, and visible light having wavelength larger than 465 nm is almost completely transmitted. UV cut filter 902 of FIG. 10 reflects UV light when dam 120 is UV cured during the manufacture of LCOS display panel 900, but transmits visible light when LCOS display panel 900 is in operation. Thus LCOS display panel 900 can be used for displaying visible image.

Figure 12:
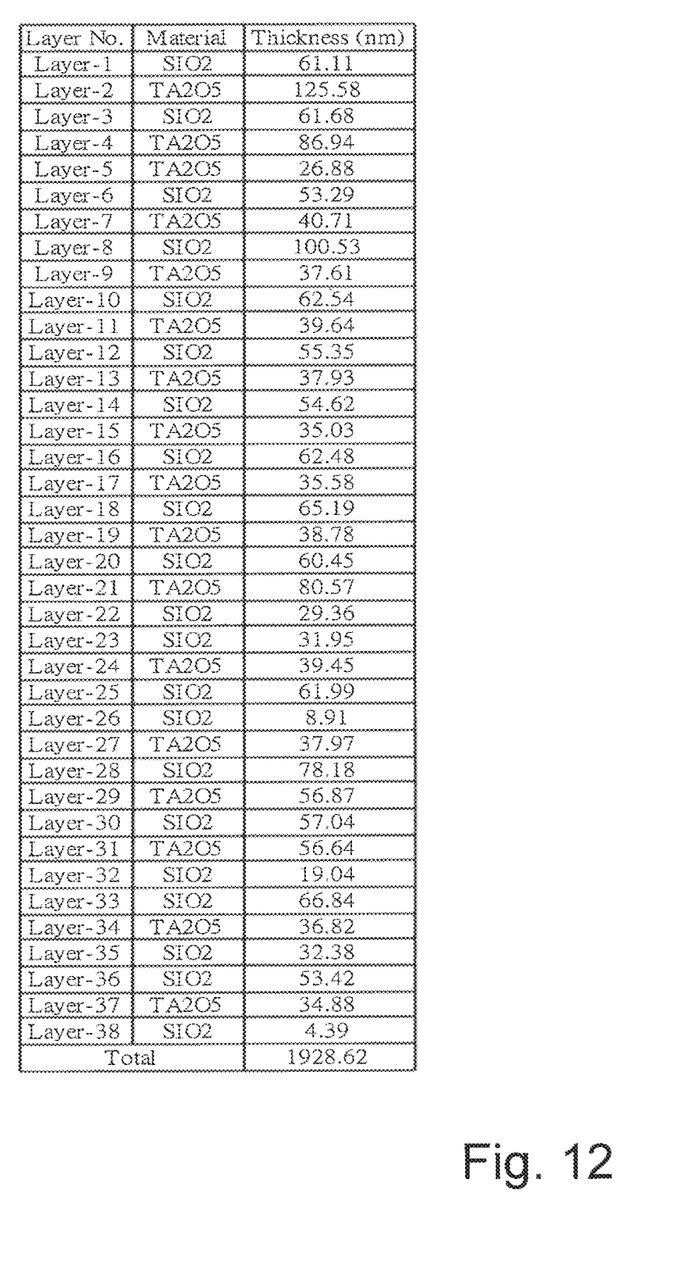
FIG. 12 shows an exemplary UV cut filter, which is an interference filter comprising multiple thin films, according to an embodiment of the present invention.

Similarly, UV cut filter 902 is preferably an interference filter comprising multiple thin films as shown in FIG. 12. FIG. 12 shows another multiple thin film structure of an exemplary interference filter, according to an embodiment of the present invention. The interference filter is similarly made of alternate films of $SiO_2$ (silicon dioxide) having lower refractive index (1.4585) and $Ta_2O_5$ (tantalum pentoxide) having higher refractive index (2.1306) coated on glass substrate 112 opposite to ITO layer 114.

Figure 13:
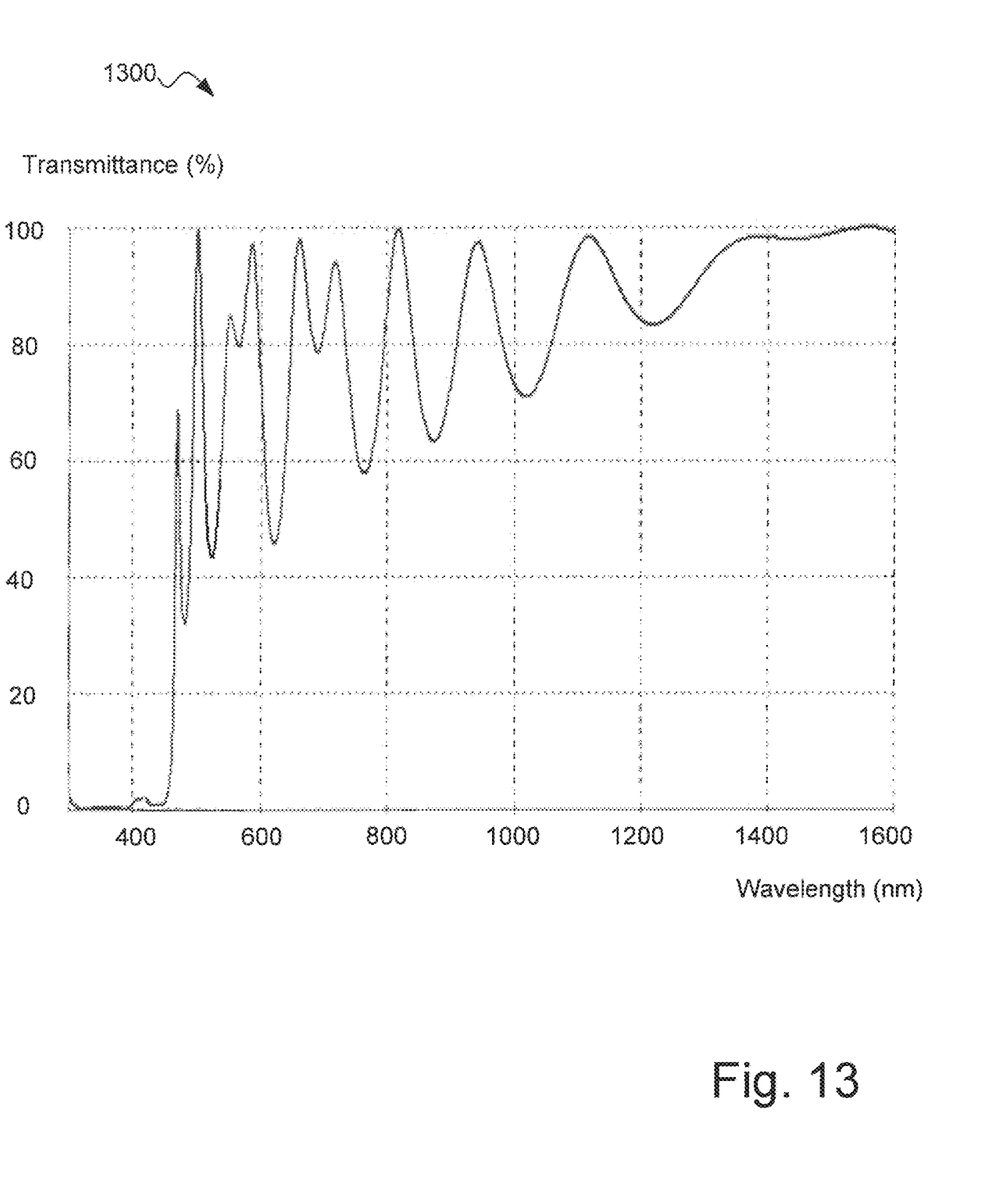
FIG. 13 shows an exemplary spectral transmittance response of the UV cut filter of FIG. 12, according to an embodiment of the present invention.

An exemplary spectral transmittance response 1300 of UV cut filter 902 of FIG. 12 is depicted in FIG. 13, according to an embodiment of the present invention. Spectral response 1300 shows that UV light having wavelength less than 450 nm is reflected, and SWIR light having wavelength larger than 1400 nm is almost completely transmitted. UV cut filter 902 of FIG. 12 reflects UV light when dam 120 is UV cured during the manufacture of LCOS display panel 900, but transmits SWIR light when LCOS display panel 900 is in operation for any applications, such as telecommunications and others.

While the present invention has been described herein with respect to the exemplary embodiments and the best mode for practicing the invention, it will be apparent to one of ordinary skill in the art that many modifications, improvements and sub-combinations of the various embodiments, adaptations and variations can be made to the invention without departing from the spirit and scope thereof.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A LCOS crystal on silicon) display panel comprising:
   a silicon substrate;
   a reflective pixel structure on the silicon substrate;
   a first and a second PI (polyimide) layers;
   a LC (liquid crystal) layer between the first and the second PI layers, wherein the first PI layer is disposed on the reflective pixel structure, and the LC layer is disposed on the first PI layer;
   a glass substrate;
   an ITO (indium tin oxide) layer;
   a dam sealing a perimeter of the LCOS display panel to enclose the LC layer within the dam,
   wherein the dam is disposed between the first and second PI layers, and holds the silicon substrate and the glass substrate together;
   a UV (ultra violet) cut filter covering an active area of the LCOS display panel, wherein the active area of the LCOS display panel includes the LC layer and the reflective pixel structure;
   wherein the UV cut filter is formed on the glass substrate; and
   an AR (anti reflection) layer coated on the glass substrate opposite to the ITO layer;
   wherein a UV light transmits through the AR layer, the glass substrate, the second PI layer, the dam, the first PI layer, and the silicon substrate, and the UV light is absorbed by the dam to UV cure the dam.

2. The LCOS display of claim 1, wherein the UV cut filter is disposed between the glass substrate and the ITO layer.

3. The LCOS display of claim 2, wherein the UV cut filter and the ITO layer are enclosed in the second PI layer attached to the glass substrate.

4. The LCOS display of claim 1, wherein the UV cut filter reflects UV light having wavelength less than 450 nm and transmits visible light having wavelength larger than 465 nm.

5. The LCOS display of claim 1, wherein the UV cut filter reflects UV light having wavelength less than 450 nm and transmits SWIR (short wave infra red) light having wavelength larger than 1400 nm.

6. The LCOS display of claim 1, wherein the UV cut filter is an interference filter.

7. A LCOS (liquid crystal on silicon) display panel comprising:
   a silicon substrate;
   a reflective pixel structure formed on the silicon substrate;
   a first PI (polyimide) layer disposed on the reflective pixel structure,
   a LC (liquid crystal) layer disposed on the first PI layer,
   a second PI layer disposed on the LC layer;
   an ITO (indium tin oxide) layer disposed on the second PI layer;
   a UV (ultra violet) cut filter disposed on the ITO layer, wherein the UV cut filter covers the LC layer;
   a glass substrate disposed on the UV cut filter;
   an AR (anti reflection) layer disposed on the glass substrate; and
   a dam sealing a perimeter of the LCOS display panel to enclose the LC layer within the dam,
   wherein the dam is disposed between the first and second PI layers, and holds the silicon substrate and the glass substrate together;

wherein a UV light transmits through the AR layer, the glass substrate, the second PI layer, the dam, the first PI layer, and the silicon substrate, and the UV is absorbed by the dam to UV cured the dam.

8. The LCOS display of claim 7, wherein the UV cut filter reflects UV light having wavelength less than 450 nm and transmits visible light having wavelength larger than 465 nm.

9. The LCOS display of claim 7, wherein the UV cut filter reflects UV light having wavelength less than 450 nm and transmits SWIR (short wave infra red) light having wavelength larger than 1400 nm.

10. The LCOS display of claim 1, wherein the UV light further transmits through the ITO layer between the glass substrate and the second PI layer.

11. The LCOS display of claim 7, wherein the UV light further transmits through the ITO layer between the glass substrate and the second PI layer.

* * * * *